United States Patent Office 3,444,112
Patented May 13, 1969

3,444,112
WATER-SOLUBLE PAINT COMPOSITION
Wataru Koga, Masahiro Abo, Yoshio Yasuoka, Michio Nozaki, and Kanemasa Nomaguchi, Hitachi-shi, Japan, assignors to Hitachi Kasei Kogyo Kabushiki Kaisha, Tokyo-to, Japan, a company of Japan
No Drawing. Filed Sept. 3, 1963, Ser. No. 306,320
Claims priority, application Japan, Sept. 6, 1962, 37/38,028; Sept. 12, 1962, 37/39,313
Int. Cl. C08g 5/18, 5/20; C09d 3/54
U.S. Cl. 260—19        12 Claims

ABSTRACT OF THE DISCLOSURE

A water-soluble paint composition based on oil-soluble phenol-formaldehyde resins, drying- or semidrying vegetable oils which are simultaneously reacted with $\alpha,\beta$-unsaturated dibasic acids under heat to obtain an oil-modified phenolic resin. The resultant product is reacted with ammonium hydroxide or a water-soluble amine and can then be diluted with water.

This invention relates to water-soluble paint compositions comprising an aqueous solution of ammonium salt of a resin-like substance obtained through a heating reaction of drying or semidrying vegetable oils, oil-soluble phenol resin, and $\alpha,\beta$-unsaturated dibasic acids.

Heretofore, most of the conventional paints have been using, as one of the principal components, a large quantity of organic solvent which is extremely inflammable and combustible, as well as undesirable from the standpoint of sanitation. On account of this fact, special care has been taken in manufacture, storage, transportation, and use of such paints as "dangerous material" set forth in fire prevention law in Japan, and there have always been strong desires for solution of the said problematical points especially from those who handle a large quantity.

Moreover, a large quantity of the solvent is considered as loss because of the fact that the solvent evaporates during drying of the paint film, without forming a part of the film. From this viewpoint, there have been earnest desires for safe and low price paints using water as solvent thereof.

To meet such desires, there have been developed recently several kinds of water-soluble resin paints such as water-soluble melamine resin paint, water-soluble alkyd resin paint, etc.

However, such water-soluble paints did not show much waterproof property even after the paint films have been baked. Moreover, their coating properties were generally inferior to those of the solvent-type paints.

However, few suggestions have been made so far for water-soluble piants using oil-soluble phenol resin which is useful as moisture proof or rust proof paint or insulating paint.

For instance, it is considered to be difficult to impart a water solubility to a resin-like substance which is obtained through a heating reaction of a mixture of oil-soluble 100% alkylphenol resin and a drying oil. Despite of the fact that coating property of varnish using the said resin-like substance is excellent, there has been no development in its application as water-soluble paint.

Also, it is well known that the ammonium salt of maleic oil is soluble in water, but its film forming capability is not sufficient and the film is brittle with the result that it does not serve for practical purposes. In order to improve such defects, it is considered to add other resinous material, especially oil-soluble phenol resin. However, it is extremely difficult to impart water solubility to the above-mentioned paint materials by merely mixing them physically.

It is an essential object of this invention to impart water solubility to oil-soluble phenol resin having an excellent coating property.

It is another object of this invention to impart an excellent film-forming capability to aqueous solution of ammonium salt of resin-like substance obtained by the reaction of drying or semidrying vegetable oil with $\alpha,\beta$-unsaturated dibasic acids.

It is still another object of this invention to provide a water-soluble phenol resin paint which is cheap and not liable to cause fire or ignition.

It is a further object of this invention to provide a paint composition which, despite of its being water-soluble paint, imparts an excellent water-proof property to a film prepared by said composition in case said film is baked.

It is still another object of this invention to provide a water-soluble paint which is capable of displaying a coating property similar to or better than that of the oil-soluble resin paint.

The details of the invention as well as the manner in which the foregoing objects, other objects, and advantages of the present invention may be best achieved will be more clearly apparent by reference to the following description.

The present invention can be accomplished by preparing an aqueous solution of ammonium salt of resinous substance which is obtained by a method which comprises adding and mixing 5–30 weight parts of $\alpha,\beta$-unsaturated dibasic acid to and with 100 weight parts of a mixture consisting of 20–70 weight parts of oil-soluble phenol resin and 80–30 weight parts of drying or semidrying vegetable oil, and causing the said mixed product to be reacted by heating. That is, the paint composition of this invention is obtained by adding an adequate amount of $\alpha,\beta$-unsaturated dibasic acid to an oil-soluble phenol resin when said phenol resin is prepared by heating an oil-soluble alkylphenol resin and a drying or semidrying vegetable oil, and by converting the said product into an aqueous solution of ammonium salt.

As the oil-soluble phenol resins to be used for this invention, the following are available: alkylphenol resin produced by chemical reaction of formaldehyde with paratertiary butyl phenol, para-amylphenol, para-octylphenol, para-phenyl phenol, orthophenyl phenol, paracumyl phenol, etc. or rosin-modified phenol resin and the like.

Also, modified alkyl phenol resin can be used, which is obtained through a reaction of phenol or alkylphenol derivative with alkyl substituted benzene formaldehyde resin which is a liquid or solid, light yellowish resin obtained by addition and condensation, in the presence of an acid catalyst such as sulfuric acid, of formaldehyde with at least one kind selected from the group consisting of alkyl-substituted benzenes such as toluene, xylene, ethyl benzene, methyl benzene, isopropyl benzene, cumene, mesitylene, durene, etc.

The alkyl-substituted benzene formaldehyde resin to be used in the invention has chemical structures as illustrated in the following formulae wherein the gap between the said alkyl-substituted benzene nuclei is mostly connected by a methylene ether linkage ($—CH_2OCH_2—$) or an acetal linkage [$—CH_2O(CH_2O)_nCH_2—$], etc.,

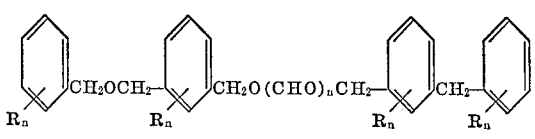

where $R_n$ is $CH_3—$, $C_2H_5—$, $C_3H_7—$ etc., and $n = 1–4$. These condensates produce modified alkylphenols through the following condensation reaction with a compound having active hydrogen such as phenol in the presence of an adequate catalyst, or merely by heating said condensates.

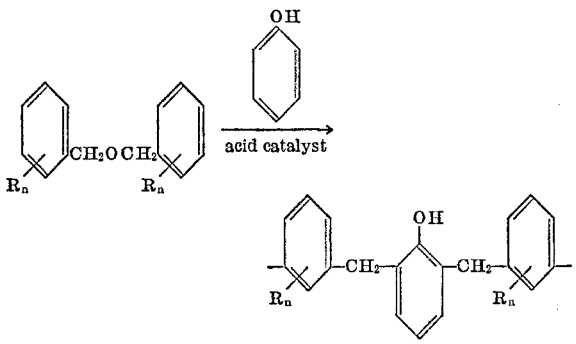

where $R_n$ are $CH_3$—, $C_2H_5$—, $C_3H_7$—, etc., and $n=1-4$.

Thus, from the standpoint of synthetic resin technique, reforming of phenol resins is a matter of interest. By adopting this modification method, it becomes possible to obtain various resinous products having better properties in alkaliproof, waterproof or weatherproof property than those which use conventional phenol resins in full percentage.

Therefore, it is significant, from the standpoint of providing excellent paint compositions, to use modified alkyl-phenol resin as a raw material.

Besides the above-mentioned phenol, phenols such as cresol, paratertiary butylphenol, para-amylphenol, para-octyl phenol, paraphenylphenol, orthophenylphenol, paracumyl phenol, and bisphenol A, etc. are used for modification of alkyl-substituted benzene formaldehyde resin.

Mixing ratio of alkyl-substituted benzene formaldehyde resin and phenols should be such that the latter is made at least 0.5 mole per 1 mole of oxygen contained in the former, and it is most preferable that the latter is in a range of 0.7–1.5 mole.

Each of these reactants is heated up to 100–200° C., and condensed, thereby a desired modified alkyl phenol resin having a good oil solubility is produced.

A rosin modified phenol resin is obtained through reaction of formalin and phenols such as phenol, cresol or other alkyl-phenol with rosin, in the presence of an adequate acid catalyst.

The foregoing descriptions of various oil-soluble phenol resins are intended to explain the oil-soluble phenol resin to be used in the present invention and they are not the purport of the present invention.

The drying or semidrying vegetable oils to be used for this invention are linseed oil, soybean oil, safflower oil, etc. The properties of the vegetable oils being raw materials can be changed by addition of China-wood oil, castor oil, dehydrated castor oil, etc. as well as saturated or unsaturated fatty acids such as tall oil fatty acid to a part of oil length. Also, ester exchange vegetable oils of the said mixture of the vegetable oils can be used.

Though there is some difference according to materials, the optimum mixing ratio of the oil-soluble phenol resin and drying or semidrying vegetable oils to be used in this invention is preferably 80–30 weight parts of the latter to 20–70 weight parts of the former, because when the mixing ratio goes beyond the said range, the coating film thus formed will be extremely brittle and lacking of flexibility, or it will not shown sufficient hardness from a practical standpoint, even if the flexibility is high enough. In order to obtain ideal coating films, mixing should be carried out at a ratio of 70–40 weight parts of the latter to 30–60 weight parts of the former. The mixing ratio of $\alpha,\beta$-unsaturated dibasic acid is 5–30 weight parts, especially 10–20 weight parts, to 100 weight parts of the mixture of the said oil-soluble phenol resin and drying or semidrying vegetable oils. In case $\alpha,\beta$-unsaturated dibasic acid is less than 5 weight parts, water solubility of the condensed oil modified resin thus obtained becomes inferior, when it is converted to an ammonium salt, with the result that it becomes necessary to use a large amount of organic solvent which is liable to cause danger of fire. If more than 30 weight parts are used, the resulting coating film will be britttle and lower in water-proof property, whereby the object of this invention will not be attained. Though maleic anhydride and fumaric acid etc. can be used as $\alpha,\beta$-unsaturated dibasic acids, since the fumaric acid is generally inferior in its reactivity and stability, maleic anhydride is used preferably.

The conditions for heating reaction of the mixture of the said three materials are not much different from those in the production of the conventional oil-soluble phenol resin paint, i.e., it is enough to heat the mixture at a temperature of 180–250° C. for 30 minutes to 3 hours. The acid value of the oil-soluble phenol resin thus produced is preferably within a range of about 40–120.

The water-soluble paint composition according to this invention can be obtained by neutralization of an oil modified resin of said high acid value. This neutralization is almost or perfectly completed by reacting the oil modified phenol resin with ammonium hydroxide. In this case, it is adequate to determine the content of the ammonium hydroxide at 0.5–1.5 mole equivalent to 1 mole of carboxyl group existing in the oil modified phenol resin.

According to this invention, it is also possible to obtain more stable water-soluble paint compositions by using, in the said neutralization, instead of ammonium, water-soluble amines having slight volatility such as morpholine, amine, monoethanolamine, diethanolamine, triethanoldimethylamine, diethylamine, trimethylamine, triethylamine, dimethylaminoethanol etc. Furthermore, water-soluble paint composition to be used in this invention can be produced by adding an organic solvent which affiliates with water into an aqueous solution of ammonium salt of oil modified phenol resin. If this method is applied to the case in which the viscosity of the said aqueous solution of ammonium salt of the oil modified phenol resin is high or its thixotropy is great, the acid value of the paint thus obtained will become higher. For such organic solvents, mixtures of one or more kinds of alcohols selected from the group consisting of monohydric alcohols such as ethyl alcohol, n-butyl alcohol, secondary butyl alcohol, tertiary butyl alcohol, propyl alcohol, isopropyl alcohol, furfuryl alcohol, etc. and dihydric alcohols such as ethylene glycol and propylene glycol can be used.

In the same manner, glycol derivatives such as ethylene glycol monomethyl ether acetate, ethylene glycol monoethyl ether, and diethylene glycol monoethyl ether can be used also for this purpose.

The amount of the said organic solvents to be added to the composition of this invention is variable in a considerably wide range, e.g., when the mixing ratio of the organic solvent to the said oil modified phenol resin in an aqueous solution (55% of which is non-volatile part) of an ammonium salt is selected to 0–30 weight parts to 100–70 weight parts, the produced composition has the safest and most desirable coating characteristics. Although no defect appears as paint in case more than 30 weight parts of the organic solvent are added, there arises danger of ignition and inflammability, which is therefore uneconomical and unsuitable for the purpose.

The water-soluble oil modified phenol resin composition produced in the manner described heretofore can be used as baked paint in that condition. However, in most cases, favorable results will be obtained by adding a hardening catalyst thereto.

Therefore, this invention can provide rapid drying paints by addition of a drying catalyst such as lead naphthenate, cobalt naphthenate, or manganese naphthenate to the water-soluble oil modified phenol resin composition. Of course, such catalysts as described above are required to be either water-soluble or at least to be water dispersible.

Also, it is preferable to add 0–1 weight part of the hardening catalyst to 100 weight parts of the said water-soluble paint composition (non-volatile part).

The compositions according to the present invention can be used for preparing clear varnishes, enamel, primer and putty, and so on.

The invention is further explained in connection with the following examples, but it is to be understood that the scope of this invention is not to be limited to the examples described herein. (Note: "parts" appearing in the following description should be understood as "weight parts.")

Example 1

100 parts of linseed oil, 80 parts of oil-soluble alkylphenol resin having a softening point of 120° C. (according to a method prescribed in Japan Industrial Standard JISK–5902) which was obtained by heat condensation, in the presence of a very small amount of hydrochloride catalyst, of paratertiary butyl phenol and formaldehyde, the molar ratio of which is 1:0.9, and 20 parts of maleic anhydride were charged in a proper reactor, and the mixture was heated at a temperature of 230° C. for 50 minutes while being stirred, whereby a viscous resin having an acid value of 67.5 was obtained. Next, 100 parts of this resin were dissolved into 55 parts of isopropyl alcohol, and then 10 parts of concentrated ammonia water (28% $NH_3$) were added at a temperature of 60–80° C., and further diluted with 130 parts of water, 0.45 part of water-dispersible cobalt drying agent and 0.4 part of water-dispersible lead drying agent were added to 100 parts of said water soluble paint solution. The mixture was then painted on a test piece and baked at 150° C. for 30 minutes, whereby a hard, lustrous, transparent and water-proof coating film was obtained. Japan Industrial Standard JISK–5902 is an official standard for measuring the softening point and corresponds exactly to ASTM E28–58T.

Example 2

100 parts of linseed oil, 75 parts of Hitanol–1131 (oil-soluble 100% alkylphenol resin manufacturing by Hitachi Ltd., and having a softening point of 130° C.), and 25 parts of maleic anhydride were mixed and stirred for one hour while being heated at 230° C. This mixture was cooled down to 80° C. and then 115 parts of isopropyl alcohol and 30 parts of concentrated ammonia water (38% $NH_3$) were added thereto. To this mixture, after having been stirred at 60–70° C. for 30 minutes, were added 0.83 part of cobalt naphthenate (Co content 12%) and 1 part of lead naphthenate (Pb content 30%) and then they were uniformly dissolved. This solution was diluted with 226 parts of water, whereby a uniform and transparent water-soluble paint was obtained. When the paint thus obtained was painted on a test piece and was baked at a temperature of 150° C. for 25 minutes, a transparent coating film having good water-proof property, hardness, and luster was obtained. Hitanol–1131 is an oil-soluble resin obtained by the condensation of phenylphenol and formaldehyde with an acid catalyst to a softening point of approximately 130, and a color lighter than WG according to U.S. Rosin Standards.

Example 3

200 parts of gum rosin, 161 parts of paratertiary butyl phenol, 125 parts of phenol, and 150 parts of paraformaldehyde (water content 20%) were mixed and then condensed at a temperature of 100–110° C. This mixture was heated up to 250° C., to which 20 parts of glycerol were added and then esterified in the current of carbon dioxide gas, whereby a rosin modified phenol resin having an acid value of 16 and a softening point of 150° C. was obtained. Thereafter, 85 parts of this resin and 100 parts of linseed oil were mixed with 15 parts of maleic anhydride. This mixture was stirred at 250° C. for 3 hours, and then was cooled down to 80° C. Further, 115 parts of isopropyl alcohol and 21 parts of concentrated ammonia water (28% $NH_3$) were added and diluted with 226 parts of water, whereby a uniform and transparent water-soluble paint was obtained.

When 1 part of water dispersible cobalt drying agent was added to said paint and this mixture was baked at 150° C. for 20 minutes, a hard, lustrous, and transparent coating film was obtained.

Example 4

80 parts of oil-soluble alkylphenol resin having a softening point of 118° C. which was prepared by heat condensation, in the presence of a small amount of hydrochloride catalyst, of paraamyl phenol and formaldehyde at a molar ratio of 1:0.8, 100 parts of linseed oil, and 20 parts of maleic anhydride were charged in an adequate reactor, and this mixture, after having been heated and stirred at 230° C. for 50 minutes, was cooled down to 80° C. Then, to this mixture 85 parts of ethylene-glycol-monoethyl-ether, 20 parts of concentrated ammonia water (28% $NH_3$), and 265 parts of water were added, and this mixture was stirred, whereby a uniform, transparent, water-soluble paint solution was obtained. Further, 0.5 part of water-dispersible cobalt drying agent and 1 part of water-dispersible lead drying agent were added to the said paint solution, which was painted on a steel plate and was baked at 150° C. for 30 minutes, whereby a transparent coating film having luster, excellent hardness and adhesive property, as well as good water-proof property was obtained.

Example 5

80 parts of oil-soluble alkylphenol resin having a softening point of 105° C. which was obtained by heat condensation, in the presence of a small amount of hydrochloride catalyst, of paraphenyl phenol and formaldehyde at a molar ratio of 1:0.9, 100 parts of safflower oil, and 20 parts of maleic anhydride were mixed and heated at 230° C. for 50 minutes while being stirred, and then were cooled down at 80° C. To this product were added 35 parts of ethylene glycol monoethyl ether, 160 parts of isopropanol, and 25 parts of cencentrated ammonia water (28% $NH_3$) and this mixture was diluted with 242 parts of water, whereby a uniform and transparent water-soluble paint solution was obtained.

Next, 1 part of water dispersible cobalt drying agent was added to the said paint solution, which was painted on a steel plate by the flow method, and was baked at 140° C. for 30 minutes, whereby a transparent coating film having luster, excellent hardness, and adhesive property as well as good water-proof property was obtained.

Example 6

100 parts of xylene formaldehyde resin (molecular weight 470, oxygen content 12.0%), 72 parts of phenol, and 0.1 part of paratoluene sulfonic acid were mixed and heated at 140° C. for 15 hours while being stirred, whereby 188 parts of light brown oil-soluble solid resin (softening point of 96° C.) was obtained.

Then, the mixture of 70 parts of this resin, 100 parts of linseed oil, and 30 parts of maleic anhydride was heated at 230° C. for 50 minutes while being stirred. Thereafter, 114 parts of isopropyl alcohol was added to the mixture at 100–80° C., followed by further addition of 37 parts of concentrated ammonia water (28% $NH_3$) at 80–60° C., and finally the solution was diluted with addition of 220 parts of water.

To 100 parts of this water soluble paint solution were added 0.45 part of water soluble cobalt and 0.40 part of lead drying agent. This mixture was then painted on a test piece and was baked at 150° C. for 30 minutes, whereby a hard, lustrous and transparent coating film having good water- and alkali-proof properties was obtained.

Example 7

100 parts of xylene formaldehyde resin (molecular weight 450, oxygen content 12.2%), 82.3 parts of cresol (meta-cresol content 50%) for industrial use, and 0.1 part of paratoluene sulfonic acid were mixed in a reactor equipped with a Diens & Stark type trap, and heated at 140° C. for 15 hours while being stirred, from which 12.5 parts of condensation water was distilled and 159 parts of a hard, transparent resin of light green color, having a softening point of 120° C. was obtained.

Then, 227 parts of soybean oil and 68.0 parts of maleic anhydride were added to said resin and this mixture was heated at 230° C. for 50 minutes while being stirred and then cooled. Thereafter, to said mixture, 259 parts of isopropyl alcohol were added at a temperature between 100 and 80° C., and 34.5 parts of ammonia water (23% $NH_3$) were added at a temperature of 80–60° C., and then this mixture was thoroughly stirred. Further, 1.88 parts of cobalt naphthenate (Co content 12%), and 2.27 parts of lead naphthenate (Pb content 30%) were added and dissolved uniformly. By diluting the said solution with 500 parts of water, a transparent, water soluble paint of light brown color with an excellent stability was obtained. The water soluble paint thus obtained was painted on a test piece and baked at 140° C. for 25 minutes, whereby a transparent coating film having luster, and water- and alkali-proof properties was obtained.

Example 8

100 parts of xylene formaldehyde resin (oxygen content 12%), 150 parts of paratertiary butyl phenol, and 0.1 part of paratoluene sulfonic acid were mixed, and heated at 140° C. for 1 hour while being stirred and further heated at 170° C. for 30 minutes, from which 11.5 parts of condensation water were distilled, and 189 parts of solid resin of light yellow, having a softening point of 108° C. were obtained.

Next, 100 parts of linseed oil and 30 parts of maleic anhydride were added to 70 parts of said resin, and this mixture was heated at 230° C. for 1 hour. Then, this reaction product was cooled down to 80° C., after which 114 parts of isopropyl alcohol and 37.1 parts of concentrated ammonia water (28% $NH_3$) were added thereto and this mixture was heated at 60–70° C. for 30 minutes while being stirred, and then 1 part of water dispersible cobalt drying agent was added. This solution was finally diluted with 220 parts of water, whereby a uniform and transparent water soluble paint was obtained. When this paint was coated on test piece and was baked at 140° C. for 30 minutes, a hard and lustrous coating film having good water-proof, acid resisting and alkali-proof properties was obtained.

Example 9

100 parts of trimethyl benzene formaldehyde resin (oxygen content 12%), 63 parts of paraamyl phenol, 87 parts of bisphenol A, and 0.05 part of xylene sulfonic acid were mived and heated at 140° C. for 1 hour while being stirred, further, followed by further heating and stirring at 170° C. for 30 minutes, whereby 12 parts of condensated water was distilled off and 226 parts of solid resin of brown color, having a softening point of 110° C., were obtained. Next, 100 parts of a mixed vegetable oil consisting of 90 parts of linseed oil and 10 parts of chinawood oil were added to 75 parts of said condensed resin, to which 25 parts of maleic anhydride were added. The mixture was heated at 230° C. for 1 hour while being stirred, and then cooled down to 100–80° C. At this temperature, 74 parts of isopropyl alcohol, 40 parts of butyl Cellosolve, 30.9 parts of concentrated ammonia water (28 $NH_3$) were added and stired thoroughly at 60–70° C., then 0.83 part of cobalt naphtheneate (Co content 12%) and 1 part of lead naphthenate (Pb content 30%) were added. This solution was finally diluted with 220 parts of water. The paint thus produced was painted on a test piece and baked at 140° C. for 25 minutes, whereby a hard and transparent water soluble coating film having water-proof property was obtained.

Example 10

100 parts of linseed oil and 25 parts of maleic anhydride were added to and mixed at 230° C. for 50 minutes with 75 parts of oil-soluble solid resin of light yellow color which had a softening point of 100° C. and obtained by mixing 100 parts of trimethyl benzene formaldehyde resin (oxygen content 9.8%), 66 parts of cresol (metacresol content 50%) for industrial use, and 0.1 part of paratoluene sulfonic acid and heating the mixture at 140° C. for 15 hours at first and then at 170° C. for 30 minutes.

35 parts of oil modified resin thus obtained were added with 10 parts of ethylene glycol monoethyl ether and 10 parts of isopropyl alcohol and dissolved, to which 5.4 parts of concentrated ammonia water (23% $NH_3$) were added, and then the mixture was diluted with 40 parts of water, thereby obtaining a uniform and transparent water-soluble paint. Then, 0.45 part of cobalt naphthenate drying agent and 0.4 part of lead naphthenate drying agent were added to said paint. When it was coated on a steel plate and baked at 150° C. for 30 minutes, a transparent coating film having excellent hardness and luster, as well as good water-, acid- and alkali-proof properties was obtained.

While the invention has been explained by describing particular embodiments thereof, it will be apparent that improvements and modifications may be made without departing from the scope of the invention as defined in the appended claims.

What is claimed is:

1. A substantially neutral water-soluble paint composition produced by mixing 5 to 30 weight parts of an alpha, beta-unsaturated dibasic acid with 100 parts of a mixture consisting of 20 to 70 weight parts of an oil-soluble phenol-formaldehyde resin and 80 to 30 weight parts of a drying oil, heating the entire mixture thus obtained at substantially 180 to 250° C. to an acid value of approximately 40 to 120, and neutralizing said mixture with a substance selected from the group consisting of aqueous ammonia, water-soluble organic monoamines, or mixtures thereof.

2. A composition according to claim 1, in which the oil soluble phenol resin is of at least one kind selected from the group consisting of alkyl phenol resin, rosin modified phenol resin, alkyl benzene formaldehyde resin modified alkyl phenol resin, and mixtures thereof.

3. A composition according to claim 1, in which the drying vegetable oil is of at least one kind selected from the group consisting of linseed oil, soybean oil, safflower oil, and mixtures thereof.

4. A composition according to claim 1, in which the drying vegetable oil is added with, at a part of oil length, at least one kind selected from the group consisting of chinawood oil, castor oil, and dehydrated castor oil.

5. A composition according to claim 1, in which the $\alpha,\beta$-unsaturated dibasic acid is maleic anhydride.

6. A composition according to claim 1, in which the water soluble amine is one kind selected from the group consisting of morpholine, dimethyl amine, diethyl amine, trimethyl amine, triethyl amine, monoethanol amine, diethanol amine, triethanol amine, dimethyl aminoethanol, diethyl aminoethanol, and mixtures thereof.

7. A composition according to claim 1, in which the drying catalyst is one kind selected from the group consisting of cobalt naphthenate, lead naphthenate, manganese naphthenate and mixtures thereof.

8. A composition according to claim 1, wherein said resulting mixture is obtained by simultaneous reaction of 30 to 60 parts by weight of oil-soluble phenol-formaldehyde resin, 70 to 40 parts by weight of a drying vegetable oil, and 10 to 20 parts by weight of unsaturated dibasic acid.

9. A composition according to claim 18, wherein an amount of 30 parts by weight of an organic solvent capable of being dissolved together with water is added to and mixed with 70 to 100 parts by weight of said composition having a non-volatile content of 55%.

10. A composition according to claim 9, in which the organic solvent capable of being dissolved together with water is one kind selected from the group consisting of ethylalcohol, tertiary butylalcohol, n-butanol, secondary butanol, propyl alcohol, isopropylalcohol, furfuryl alchol, propylene glycol, ethylene glycol and mixtures thereof.

11. A composition according to claim 9, in which the organic solvent capable of being dissolved together with water is one kind selected from the group consisting of glycol derivatives such as ethylene glycol monomethyl ether acetate, ethylene glycol monoethyl ether, diethylene glycol monoethyl ether and mixtures thereof.

12. A process for the manufacture of a substantially neutral, water-soluble varnish for paints which comprises mixing substantially 5 to 30 weight parts of an alpha, beta-unsaturated dibasic acid with 100 parts of a mixture consisting of 20 to 70 weight parts of an oil-soluble phenol-formaldehyde resin and 80 to 30 weight parts of a drying oil, heating the entire mixture thus obtained at substatnially 180–250° C. to an acid value of substantially 40 to 120, neutralizing said entire mixture with a substance selected from the group consisting of aqueous ammonia, water-soluble organic monoamines, and mixtures thereof, adding a drier, selected from the group consisting of cobalt naphthenate, lead naphthenate, manganese naphthenate, and mixtures thereof, and thinning with water to a given viscosity.

References Cited

UNITED STATES PATENTS

| | | | |
|---|---|---|---|
| 2,188,882 | 1/1940 | Clocker | 260—405 |
| 2,188,883 | 1/1940 | Clocker | 260—341 |
| 2,188,887 | 1/1940 | Clocker | 134—24 |
| 2,188,890 | 1/1940 | Clocker | 260—18 |
| 2,641,593 | 5/1953 | Telter et al. | 260—78 |
| 2,878,198 | 3/1959 | Ingram et al. | 260—19 |
| 3,230,162 | 1/1966 | Gilchrist | 204—181 |
| 3,298,848 | 1/1967 | Nachholtz et al. | |
| 3,297,557 | 1/1967 | Huggard. | |
| 3,251,790 | 5/1966 | Christenson et al. | |
| 3,351,675 | 11/1967 | Gilchrist | 260—29.3 X |
| 3,351,575 | 11/1967 | Gilchrist | 260—19 |

FOREIGN PATENTS 602,166   5/1948   Great Britain.

DONALD E. CZAJA, *Primary Examiner.*

C. WARREN IVY, *Assistant Examiner.*

U.S. Cl. X.R.

260—29.3, 22